United States Patent

Estaque et al.

[11] Patent Number: 5,279,396
[45] Date of Patent: Jan. 18, 1994

[54] BRAKE ROTOR ARMATURE WITH AIR COOLING FINS HAVING EMBEDDED INSERTS

[75] Inventors: Michel Estaque, Taverny; Olivier Bardon, Cergy, both of France

[73] Assignee: Labavia - SGE, Montigny-Le-Bretonneaux, France

[21] Appl. No.: 72,863

[22] Filed: Jun. 7, 1993

Related U.S. Application Data

[63] Continuation of Ser. No. 787,914, Nov. 6, 1991, abandoned.

[30] Foreign Application Priority Data

Nov. 9, 1990 [FR] France ............................. 90 13927

[51] Int. Cl.⁵ ........................ H02K 49/04; H02K 1/32
[52] U.S. Cl. ........................ 188/264 A; 188/218 XL; 310/93; 310/105; 416/186 R
[58] Field of Search ............ 188/264; 310/93, 105; 416/93; 192/84

[56] References Cited

U.S. PATENT DOCUMENTS

| | | | |
|---|---|---|---|
| 4,488,074 | 12/1984 | Marandet | 310/93 |
| 4,712,656 | 12/1987 | Courtois | 188/218 XL |
| 4,811,822 | 3/1989 | Estaque | 188/218 XL X |
| 4,853,574 | 8/1989 | Estaque | 310/105 |
| 4,982,127 | 1/1991 | Marandet | 310/105 |

FOREIGN PATENT DOCUMENTS

| | | | |
|---|---|---|---|
| 1011045 | 6/1957 | Fed. Rep. of Germany | 310/93 |
| 1007200 | 3/1952 | France | 310/93 |
| 1237438 | 6/1960 | France | 310/93 |
| 1587639 | 3/1970 | France | 416/186 R |
| 0190498 | 10/1984 | Japan | 416/186 R |
| 0235104 | 3/1945 | Switzerland | 416/186 R |

Primary Examiner—Robert J. Oberleitner
Assistant Examiner—Josie A. Ballato
Attorney, Agent, or Firm—Larson and Taylor

[57] ABSTRACT

This concerns a rotor armature of an electromagnetic retarder, comprising at least one disk (2) axially prolonged over one of its faces by a plurality of fins (9), each fin being delimited by two faces which are parallel or substantially so, and are inclined with the corresponding radii, the tips of these fins being connected together by an annular flange (11) and the assembly of the disk, of the fins and of the flange being formed all in one piece molded from a ferromagnetic material. This rotor comprises, between the disk (2) and the flange (11), between the fins (9) molded in one piece with the disk and the flange, a plurality of thermally conductive independent inserts (13) extending parallel to the axis of the rotor and whose axial end edges (15) are embedded to a small depth in respectively the two mutually opposite transverse faces of the disk and the flange.

8 Claims, 2 Drawing Sheets

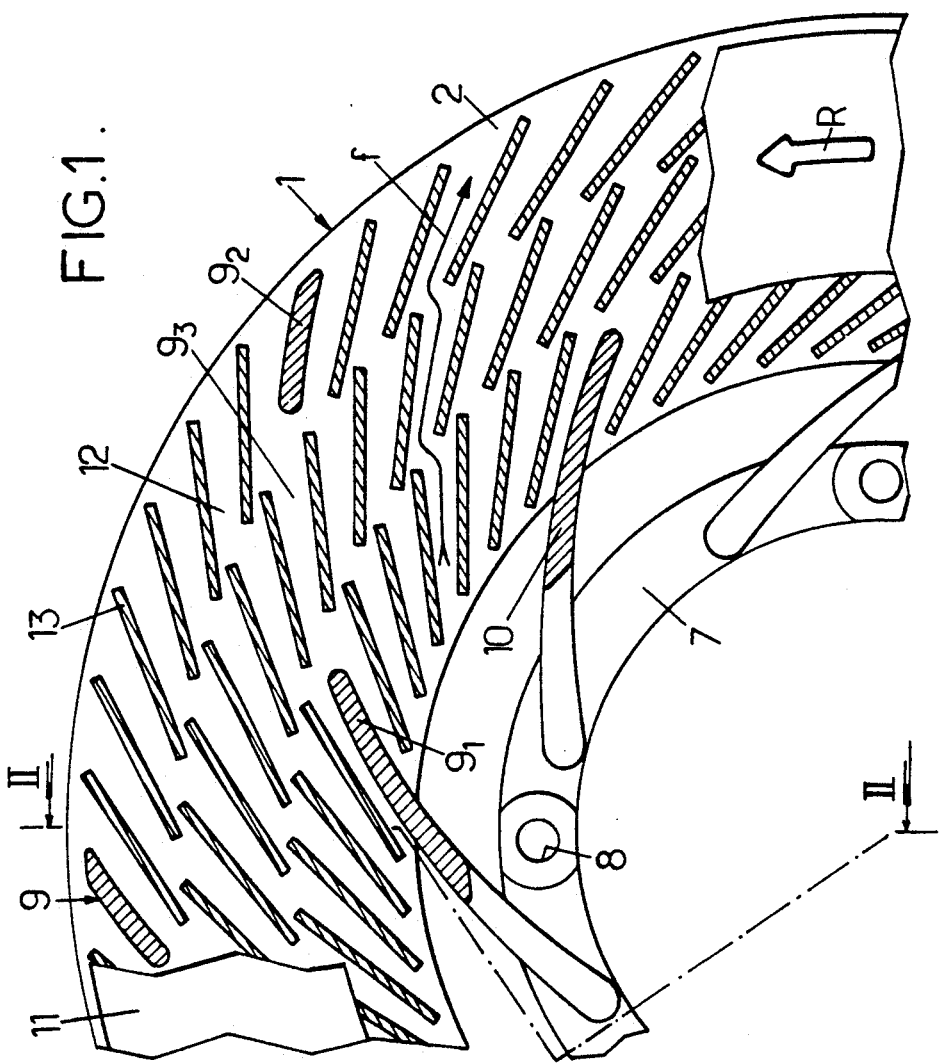
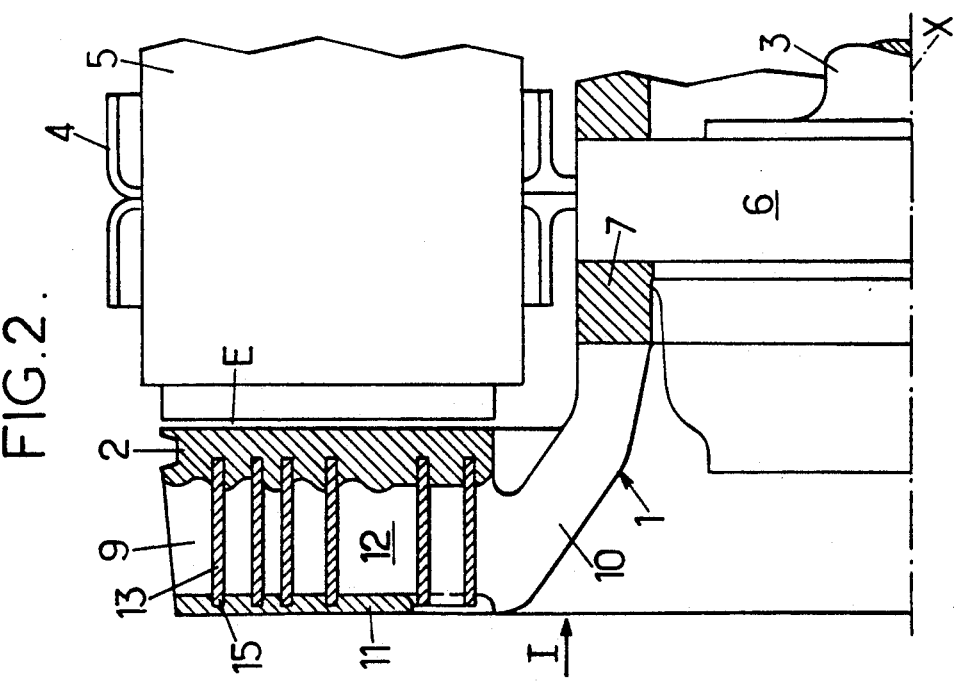

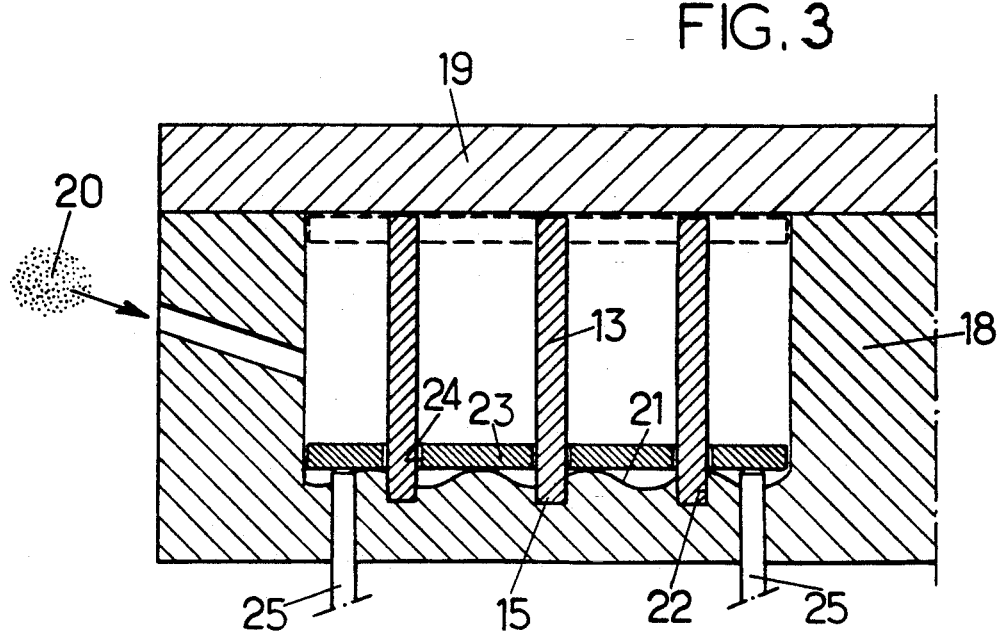
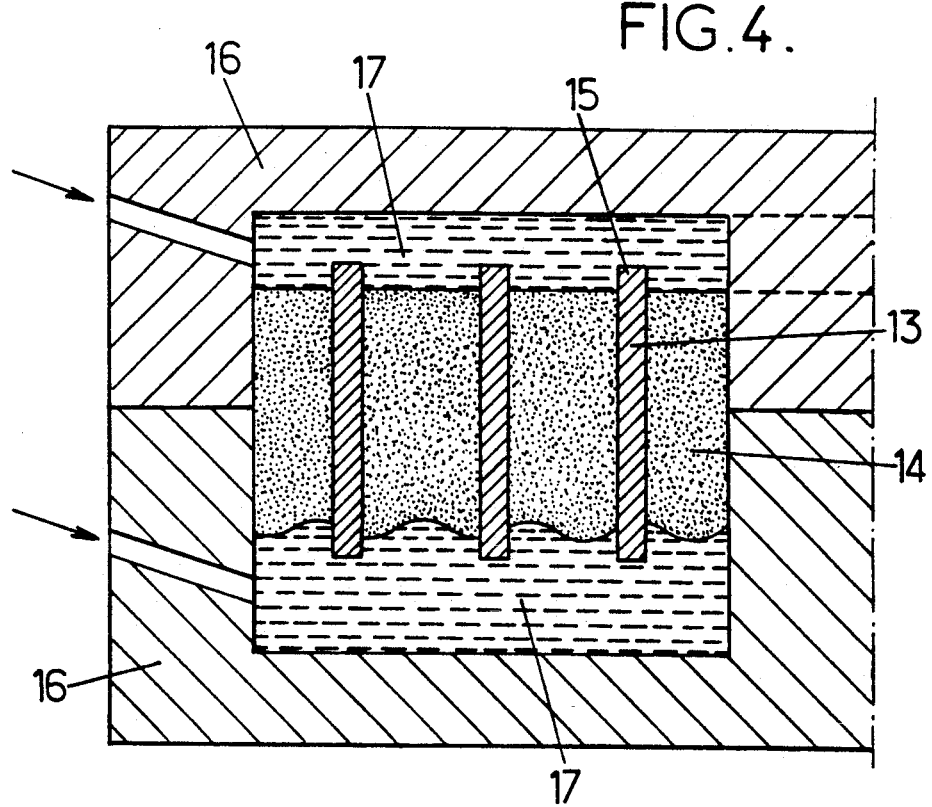

BRAKE ROTOR ARMATURE WITH AIR COOLING FINS HAVING EMBEDDED INSERTS

This application is a continuation of application Ser. No. 07/787,914, filed Nov. 6, 1991, now abandoned.

The invention relates to the rotor armatures of electromagnetic retarders, especially for vehicles, rotors comprising at least one disk made of a ferromagnetic material suitable for moving past an opposite stator ring of alternately positive and negative electromagnetic poles, from which it is separated only by an air gap, this disk then being braked and heated due to the creation of eddy currents in its mass.

Among these rotors, it is most particularly intended for those in which the face of the disk opposite the air gap is connected to a plurality of fins, each fin extending axially from said face and being delimited by two faces which are parallel or substantially so, and are inclined with the corresponding radii, the tips of these fins being connected together by an annular flange and the assembly of the disk, of the fins and of the flange being formed all in one piece molded from a ferromagnetic material.

Each fin may extend, as a continuous whole, from an internal edge located in the vicinity of the cylindrical surface containing the internal edge of the disk to an external edge located in the vicinity of the cylindrical surface containing the external edge of this disk.

But in advantageous embodiments forming the subject of U.S. Pat. No. 4,712,656, each fin is decomposed into a plurality of sections or elementary fins which may be transversely offset from each other in relation to the paths of the ventilation air so as to improve the turbulence of this air without increasing annoyingly the load losses, the various elementary fins then preferably being uniformly distributed in concentric "rings".

The invention is also intended for the manufacturing processes and devices of the rotors in question.

Dissipation of the heat generated in the disk of such a rotor by the eddy currents, when employing the retarder equipped with this rotor, is essentially achieved by conduction, radiation and convection from the disk, from the fins and from the flange, the convection being strongly reinforced by ventilation: indeed, the presence of the fins causes the rotor to act as a fan by sweeping the hot surfaces to be cooled with a stream of cooling air.

In known embodiments, the fins are relatively thick and few in number.

Indeed, the rotors in question are generally manufactured by a process of casting into sand molds, which process does not enable fins of thickness less than 7 mm to be produced; in practice, in known embodiments, rotors having an outer diameter of the order of 500 mm comprise a number of identical fins equal to 8 or 16 and to a maximum of 24 for each "ring" in question.

In order to increase the heat dissipation capacity of such a retarder rotor and therefore to increase the value of the hot torque generated by this apparatus, without also increasing substantially the torque required for driving the rotor, it is proposed to increase the number of fins included in each "ring" of fins and therefore to reduce the thickness of these fins.

Such a configuration has been proposed in U.S. Pat. No. 4,853,574 of the Applicant, this configuration making it possible to produce particularly thin identical fins, closely spaced and many in number, their thickness being less than 5 mm, their average separation being less than 10 mm and their number being greater than 24, and especially equal to 64 for each "ring" in question.

This configuration makes it possible to improve the heat dissipation and therefore the hot efficiency of the retarder.

However, it assumes the implementation of a disposable-pattern precision-molding process which is relatively costly.

The object of the invention is especially to overcome this drawback, that is to say to obtain relatively economically a rotor having a large number of particularly thin and closely-spaced fins in order to improve the cooling of the corresponding retarder, and therefore the braking torque which it generates.

For this purpose, the rotors of the kind in question according to the invention are essentially distinguished in that they comprise, between the disk and the flange, in addition to relatively thick fins, spaced apart, few in number and molded as one piece with the disk and the flange, a plurality of thermally conductive independent inserts extending parallel to the axis of the rotor and whose axial end edges are embedded to a small depth in respectively the two mutually opposite transverse faces of the disk and the flange.

Furthermore, in preferred embodiments, one and/or the other of the following dispositions is used:

the inserts are inclined at each of their points, with the radii of the rotor which pass through these points, at angles substantially equal to the angles of inclination, with the corresponding radii, of the fin portions which circumferentially flank these inserts, each insert extends only over a fraction of the radial extent of the disk, the reaction according to the preceding paragraph is between a quarter and a half, these limits inclusive, each insert has a constant thickness, the inserts are substantially curved as the fins which circumferentially flank them, each fin is formed from a plurality of separate sections, each fin comprises an internal section and an external section which are located in the extension of each other, the inserts are distributed so as to form, around the axis of the rotor, rings of inserts which are identical, equidistant and similarly inclined with the corresponding radii, in a rotor according to the two preceding paragraphs, the number of concentric rings of inserts is equal to three, the inner ring and the outer ring are both interrupted at the position of the fin sections which traverse respectively both these rings, and the intermediate ring extends around the entire periphery of the rotor by traversing the fins at the position of the gaps between their constituent sections, each insert is formed by a plurality of attached sheets, at least one of which is made from a material which is a good thermal conductor and at least another of which is made from a mechanically strong material.

As regards the process for manufacturing the rotors in question, the procedure is advantageously as follows: sand cores are first manufactured, into each of which are embedded a plurality of inserts in their respective locations which they are intended to occupy in the completed rotor, the opposing edges of these inserts, which are intended to be embedded in the disk and in the flange, projecting out of said core over a length equal to the desired depth of embedding, and these cores are placed in the mold intended for the manufacture of the rotor before casting into this mold the liquid ferromagnetic material.

Finally, as regards the devices for manufacturing the above-mentioned cores, the latter advantageously comprise:

a core box associated with a cover and sand injection means, the core box, whose bottom has a shape identical to that desired for the fact of the disk of the completed rotor, delimiting one of the compartments of this rotor disposed between two consecutive fins, said bottom being recessed by grooves suitable for receiving the opposite edges of the inserts in question, a plate opened so as to be traversed quasicontiguously by said inserts and initially lying on the bottom of the box, and rammers housed in this bottom enabling the opened plate to be displaced, along the inserts, from the bottom of the box to the inner face of the cover of this box, after placing each insert in the housing formed by a groove and by the contiguous opening of the opened plate.

The invention comprises, apart from these main dispositions, certain other dispositions which are used preferably at the same time and which will be discussed more explicitly hereinbelow.

In the following, a plurality of preferred embodiments of the invention will be described by referring to the attached drawings in a manner which is, of course, not limiting.

FIGS. 1 and 2, of these drawings, show an electromagnetic retarder rotor established in accordance with the invention, respectively in a partial end view along the arrow I of FIG. 2 and in axial semi-crosssection along II—II, FIG. 1, the corresponding stator being, moreover, partially represented in outline in FIG. 2.

FIGS. 3 and 4 are diagrams showing devices for manufacturing the above rotor which are likewise in accordance with the invention.

The word "rotor" used in the present text denotes more precisely each of the one-piece subassemblies 1 which are included by the rotor assembly of axis X of an electromagnetic or "eddy current" retarder and which comprise an armature disk 2 made of a ferromagnetic material.

As is known, such a disk 2 is integrally connected with the shaft 3 to be retarded, such as the transmission shaft of a vehicle, and it is mounted so as to be able to move past or in front of the stator 4 of the retarder or, more precisely, in front of a ring of alternating positive and negative inductor poles 5 forming part of this stator, with interposition of an air gap E, the disk 2 in question then being the seat for eddy currents which are manifested by a braking and a heating of this disk.

The rotor assembly of the retarder comprises, in addition to the rotor or subassembly defined hereinabove, which is single or preferably split symmetrically on either side of the stator, an intermediate part 6 of revolution about the axis X, such as a sleeve, hub or plate-type body, which part 6 is itself fixed, generally by bolting, to the shaft 3 to be retarded, each "rotor" 1 in this case being on its side fixed by bolting to this intermediate part.

Also in a manner known per se, each rotor 1, comprises, in addition to the disk 2, and molded in one piece with this disk:

a fixing collar 7 of mean diameter less than the inner diameter of the disk 2, pierced with axial bores 8, threaded or not, which are intended to receive bolts for fixing this collar to the intermediate part 6, a ring of ventilation fins 9 projecting over the face of the disk 2, opposite its face intended to delimit the air gap E, a ring of arms 10 prolonging some of the fins 9 towards the axis X and being themselves connected to the collar 7, and an annular rim or flange 11 extending generally parallel to the disk and connecting the tips of the fins 9 so as to form, between these fins, the disk and the flange guiding channels 12 for the ventilation air.

Each fin 9 is delimited by two faces which are parallel or substantially so, and are inclined with the corresponding radii facing backwards in relation to the direction of rotation R of the rotor, if the radii are considered increasing, and which faces are curved so as to have their concavities facing backwards, the angle of inclination formed by each fin face in each of its points on the corresponding radius being greater than 40 degrees and especially of the order of 50 to 60 degrees.

Each fin 9 could be extended, as a continuous whole over its entire extent, axially between the disk 2 and the flange 11.

However, in the preferred embodiment illustrated, each fin 9 is formed by an internal section $9_1$ and an external section $9_2$ each disposed in the prolongation of the other and separated from each other by a gap $9_3$ extending over a third of the radial width of the disk, and even a little more.

The arms 10 are preferably axially bent, as in the embodiment illustrated in FIG. 2, so as axially to "reenter" the collar 7 towards the inside of the stator and thus to reduce the axial size of the central portion of the rotor.

But said arms 10 could also be "straight", their mean lines then remaining substantially contained within a single transverse plane.

The number of arms 10 of each rotor is advantageously equal to eight.

It is the dissipation of heat generated in the disk 2 by the creation of eddy currents during the operation of the retarder which the present invention proposes to improve.

For this purpose, the inner volumes of the passages 12 are equipped by a plurality of inserts 13 extending parallel to the axis X and whose two axial ends are embedded or implanted respectively in the two opposite faces of the disk 2 and the flange 11.

These inserts 13 are both thermally conductive and sufficiently resistant to deformations in order to remain firmly in place during a prolonged service, despite, especially, heating, application of centrifugal force, and outer attack (mud, stones etc.).

In a particularly advantageous embodiment, said inserts 13 are composed by a copper sheet held in a sandwich between two steel sheets.

The inserts 13 are inclined in each of their points, with the radii of the rotor which pass through these points, at angles substantially equal to the angles of inclination, with the corresponding radii, of the fin portions which circumferentially flank the inserts.

The angles in question are in general of the order of 45°.

Each insert 13 advantageously extends over only a fraction of the radial extent of the disk, said fraction being especially of the order of a third, but which can also advantageously be of the order of a quarter or of a half.

Each insert 13 advantageously has a constant thickness.

This thickness is generally less than 5 mm, being for example equal to 3 or 4 mm.

The depths of embedding of each insert respectively in the disk 2 and in the flange 11 are advantageously of the order of 5 to 10 mm for the first and of the order of 2 to 5 mm for the second.

Each insert may have a plane mean surface, as illustrated, which simplifies the manufacture, but in advantageous embodiments this mean surface is slightly curved substantially as the mean surfaces of the fins 9 which circumferentially flank these inserts.

The inserts 13 are advantageously distributed so as to form around the axis of the rotor rings of identical inserts which are equidistant and inclined substantially with the corresponding radii.

In the embodiment illustrated in this case, the number of these rings is equal to three, the inner ring is interrupted at the position of the internal sections $9_1$ of the fins 9, the outer ring is interrupted at the position of the external sections $9_2$ of said fins, and the intermediate ring disposed at the radial position of the gaps $9_3$ is extended uniformly over its entire length, some of its constituent inserts 13 even able to be disposed, at least partially, in said gaps.

When the inserts form a plurality of rings which mutually surround each other, the number of inserts in the various rings may be different.

Thus it is that in the embodiment illustrated, comprising eight fins 9 angularly offset by 45° and three rings of inserts, the number of inserts, in each ring, included in a single passage 12, that is to say between two successive fins 9, is 6 for the inner ring and the outer ring and is 7 for the intermediate ring.

As may be seen in FIG. 1, some of the inserts are angularly offset in relation to the positions which they ought to occupy in order to be in the prolongation of the adjacent inserts.

Thus it is that some of the streams of cooling air do not spread along a simple arc of a circle but along a zigzag path f.

These tortuous paths are advantageous in that there is a degree of turbulence in the air streams in question which corresponds to them, and which favors heat exchange.

The rotor equipped with "inserted" or "embedded" inserts as is described hereinabove may be manufactured in any desirable fashion.

According to an advantageous embodiment, sand cores 14 (FIG. 4) are first manufactured, into each of which a plurality of inserts 13 are embedded, in their respective locations which they are intended to occupy in the completed rotor, the opposite edges 15, of these inserts, intended to be embedded in the disk and in the flange, projecting out of said core 14 over a length equal to the desired depth of embedding.

These cores 14 bristled with edges 15 are subsequently placed in the mold 16 intended for manufacturing the rotor before casting into this mold the liquid ferromagnetic material 17 intended to form said rotor.

During this casting, the material 17 completely encompasses the edges 15 and, after hardening of said material, the part thus molded is extracted from the mold 16 and the sand constituting the core is removed, especially by shaking the assembly with the aid of a vibrating screen and then by cleaning the part by shot-blasting.

In order to manufacture the core 14, itself loaded with inserts 13 having projecting edges 15, use is advantageously made of a core box 18 (FIG. 3) associated with a cover 19 and with sand injection means 20.

The bottom 21 of this box has a shape identical to that desired for the face of the disk 2 of the completed rotor, which delimits one of the compartments of this rotor disposed angularly between two consecutive fins 9, said bottom 21 being recessed by grooves 22 able to receive the opposite edges 15 of the inserts 13 in question.

A plate 23 opened in openings 24 so as to be traversed with a very small clearance by said inserts 13 initially rests on the bottom 21.

The distance, measured perpendicularly to the plate 23, between the bottom of the grooves 22 and the inner plane face of the cover 19, is equal to the dimension of each insert 13 intended to be oriented parallel to the axis X of the completed rotor.

Rammers 25 housed in the bottom 21 make it possible to move the opened plate 23 along the inserts 13 from this bottom 21 to the inner face of the cover 19, after installing each insert 13 in a housing formed by a groove 22 and by the contiguous opening 24 of the plate 23, and consecutive closing of the cover 19.

This latter position of the plate 23 is shown in FIG. 3 by broken lines.

It is at this stage that the sand intended to form the core 14 is injected into the core box around the median portions of the inserts 13, this sand being mixed with products, well known in terms of molding materials, intended to harden it at the end of injection.

As is clearly seen in FIG. 3, the only portions of the inserts 13 which project outside the sand core in question are:

on the one hand, the edges 15 inserted into the grooves 22 of the bottom 21, and, on the other hand, the opposite edges 15 which are housed against the inner face of the cover 19 in the openings of the opened plate 23 then put into contact with said face.

The depth of the grooves 22 and the thickness of the plate 24 are respectively given values equal to the desired depths of embedding of the inserts 13, on the one hand in the disk 2 of the final rotor, and on the other hand in the flange 11 of this rotor.

After solidification of the sand, it suffices to open the cover 19 in order to be able to extract successively the plate 23 and then the sand core 14 carrying the inserts 13 with their edges 15 projecting.

Following which, and regardless of the embodiment adopted, a rotor is finally provided whose form and advantages (especially the clear improvement in the cooling and, consequently, the considerable increase in the hot retardation torque) result sufficiently from that which has been mentioned hereinabove.

It goes without saying and, moreover, results already from that which has been mentioned hereinabove that the invention is not at all limited to those of its modes of application and embodiments which have been especially envisaged; on the contrary, it embraces all alternative forms thereof.

We claim:

1. A rotor armature of an electromagnetic retarder, having a rotary axis and comprising at least one disk which is axially prolonged over one face thereof by a plurality of fins, each fin being delimited by two faces which are substantially parallel and inclined with respect to radii of the disk passing therethrough, the fins including tips connected together by an annular flange, and an assembly of the disk, of the fins and of the flange being formed all in one piece molded from a ferromagnetic material, wherein said rotor armature further comprises, between the disk and the flange, and between the fins molded in one piece with the disk and the flange, a plurality of thermally conductive independent inserts extending parallel to the rotary axis of the rotor, said inserts having opposite axial end edges embedded continuously to a small depth in respective mutually opposite faces of the disk and the flange during the one piece molding of the assembly.

2. The rotor as claimed in claim 1, wherein the inserts are inclined with the radii of the disk which pass therethrough, at angles substantially equal to angles of inclination, with corresponding radii, of the fins which circumferentially flank these inserts.

3. The rotor as claimed in claim 1, wherein each insert extends less than a radial extent of the disk.

4. The rotor as claimed in claim 3, wherein the inserts are distributed so as to form, around the axis of the rotor, rings of inserts which are identical, equidistant and similarly inclined with the corresponding radii.

5. The rotor as claimed in claim 4, wherein each fin comprises an internal section and an external section which are each located in a prolongation of the other.

6. The rotor as claimed in claim 5, wherein there are three concentric rings of inserts, wherein an inner ring and an outer ring of these rings of inserts are both interrupted by gaps at a position of the internal and external sections of the fins which traverse, respectively, both of the inner and outer sections, and wherein an intermediate ring of these rings of inserts is extended over an entire periphery of the rotor by traversing the fins at the position of the gaps between the internal and external sections.

7. The rotor as claimed in claim 1 wherein each insert is formed by a plurality of attached sheets, of which at least one sheet is formed from a material which is a good thermal conductor and at least one other sheet is formed from a mechanically strong material.

8. The rotor as claimed in claim 1, wherein the small depth of the embedding of the inserts in the disk is at least as great as a thickness of the inserts.

* * * * *